United States Patent [19]

Lee

[11] Patent Number: 4,932,049
[45] Date of Patent: Jun. 5, 1990

[54] CELLULAR TELEPHONE SYSTEM

[75] Inventor: William C. Lee, Corona Del Mar, Calif.

[73] Assignee: PacTel Corporation, San Francisco, Calif.

[21] Appl. No.: 307,070

[22] Filed: Feb. 6, 1989

[51] Int. Cl.⁵ .............................................. H04B 7/10
[52] U.S. Cl. ...................................... 379/60; 455/33; 379/59
[58] Field of Search ................ 379/58, 59, 60; 455/33

[56] References Cited

U.S. PATENT DOCUMENTS

| | | | |
|---|---|---|---|
| 4,144,411 | 3/1979 | Frenkiel | 379/60 |
| 4,485,486 | 11/1984 | Webb et al. | 455/33 |
| 4,704,734 | 11/1987 | Menich et al. | 455/33 |
| 4,727,590 | 2/1988 | Kawano et al. | 455/33 |
| 4,755,998 | 10/1988 | Felix et al. | 379/59 |
| 4,771,448 | 9/1988 | Koohgoli et al. | 379/60 |
| 4,790,000 | 12/1988 | Kinoshita | 379/59 |
| 4,794,635 | 12/1988 | Hess | 379/60 |
| 4,799,253 | 1/1989 | Stern et al. | 379/59 |

Primary Examiner—Robert Lev
Attorney, Agent, or Firm—McCubbrey, Bartels, Meyer & Ward

[57] ABSTRACT

A cellular telephone system is described of the type wherein a plurality of contiguous cells, each having a different assigned set of transmission frequency channels, are arranged with handoff circuitry for maintaining continuous communication with mobile telephones moving from cell to cell. The system includes at least one cell having a plurality of transmitting and receiving antenna sets. Each set is positioned at a respective antenna sub-site at the perpihery of the cell or other suitable location, and is configured so that propagation and reception of signals is limited to substantially within the boundaries of the cell. Control circuitry monitor the strength of the signal received by each of the antenna sets at each frequency channel in the assigned set. Transmission, at each frequency channel in the assigned set, is confined to the antenna set at one sub-site in the cell having the strongest received signal at each frequency.

15 Claims, 2 Drawing Sheets

CELLULAR TELEPHONE SYSTEM

This invention relates to cellular telephone systems of the type wherein a plurality of contiguous cells, each having a different assigned set of transmission frequencies, are arranged with handoff means for maintaining continuous communication with mobile telephones moving from cell to cell. More particularly, the invention relates to an improved cell configuration for reducing interference and increasing system capacity for such a telephone system.

BACKGROUND OF THE INVENTION

In a typical cellular telephone system, as a mobile unit travels along a path that passes from one cell to another, a handoff occurs. The handoff action is controlled by a mobile telephone switching office (MTSO) which receives a handoff command or instruction. The handoff command is typically generated when the signal received from the mobile telephone falls below a preselected signal strength thus indicating that the mobile telephone is at the cell boundary.

Each cell in a cellular telephone system operates with a different assigned set of transmission frequencies. As a mobile telephone passes from one cell to another, the handoff signal instructs the cell which the mobile telephone is entering to begin transmitting at a frequency which is different from the frequency which was being transmitted by the cell which the mobile telephone was leaving. A similar procedure is followed when the mobile telephone passes into the next contiguous cell. Sets of assigned frequencies are different for adjacent cells, and such sets are not repeated except for cells that are far enough away from each other so that interference problems will not occur.

A mobile telephone unit typically contains a control unit, a transceiver, and an antenna system. Each cell site typically is provided with a control unit, radio cabinets, a power plant, data terminals, and antennas. The MTSO provides coordination for all the cell sites and contains suitable processing and switching means. The MTSO also interfaces with the telephone company zone offices for standard hardwired telephone systems. The communication links between the MTSO and the various cell sites are typically microwave, T carriers, or optical fiber, and carry both voice and control data between the cell sites and the MTSO.

When a user sitting in a car activates the receiver of the mobile unit, the receiver scans a plurality of set-up channels which are designated among the total channels assigned to the cell. Typically, there may be 21 set-up channels out of a total of 416 channels. (The remainder are communication channels.) The receiver then selects the strongest set-up channel and locks on for a certain time. Each site is assigned a different set-up channel. According, locking onto the strongest set-up channel usually means selecting the nearest cell site. This self-location scheme is used in the idle stage and is user-independent. It has a great advantage because it eliminates the load on the transmission at the cell site for locating the mobile unit. The disadvantage of the self-location scheme is that no location information of idle mobile units appears at each cell site. Therefore, when the call initiates from a standard non-mobile or land line to a mobile unit, the paging process is longer. Since a large percentage of calls originates at the mobile unit, the use of self-location schemes is justified. After a delay, for example, one minute, the self-location procedure is repeated.

To make a call from a mobile unit, the user places the called number into an originating register in the mobile unit, checks to see that the number is correct, and pushes a "send" button. A request for service is sent on a selected set-up channel obtained from a self-location scheme as described above. The cell site receives it, and in directional cell sites, selects the best directive antenna for the voice channel to use. At the same time the cell site sends a request to the MTSO via a high-speed data link. The MTSO selects an appropriate voice channel for the call, and the cell site acts on it through the best directive antenna to link the mobile unit. The MTSO also connects the wire-line party through the telephone company zone office.

When a land-line party dials a mobile unit number, the telephone company zone office recognizes that the called number is mobile and forwards the call to the MTSO. The MTSO send a paging message to certain cell sites based on the mobile unit number and a suitable search algorithm. Each cell site transmits the page on its own set-up channel. The mobile unit recognizes its own identification on a strong set-up channel, locks onto it, and responds to the cell site. The mobile unit also follows the instruction to tune to an assigned voice channel and initiate user alert.

When the mobile user turns off the transmitter, a particular signal (signaling tone) transmits to the cell site and both sides free the voice channel. The mobile unit resumes monitoring pages through the strongest setup channel.

During a call, two parties are on a voice channel. When the mobile unit moves out of the coverage area of a particular cell site, the reception becomes weak. The present cell site requests a handoff via an appropriate signal, for example, a 100 ms burst on the voice channel. The system switches the call to a new frequency channel in a new cell site without either interrupting the call or alerting the user. The call continues as long as the user is talking. The user does not notice the handoff occurrences.

When call traffic in a particular area increases, increased capacity may be generated by reducing the area covered by a particular cell. For example, if a cell is split into four smaller cells, each with a radius of one-half the original, traffic is increased four fold. Naturally, the smaller the cell, the more handoffs required in a cellular telephone system for a given capacity.

Although in the proper circumstances, reduced cell size is advantageous, certain problems can arise. Very often when cell size is reduced, for example to a radius of less than one mile, very irregular signal strength coverage will result. This may be caused by buildings and other structures, and can therefore become highly dependent upon the location of the mobile unit. Other problems arise in connection with signal interference. Although some cellular telephone systems have employed several sets of frequencies in a small single cell, in an attempt to increase capacity, this necessitates the limitation of reusing the same frequencies or adjacent frequencies in the neighboring cells. The overall capacity decreases.

SUMMARY OF THE INVENTION

In accordance with the invention, an improved cell configuration leads to a more uniform signal coverage contour, lowered interference levels, and relatively simple and economical construction. The improved cell includes a plurality of antenna sets, each set being positioned at the periphery of the cell or other proper position if can be found, and having transmitting and receiving means directionally configured to limit propagation and reception of signals to substantially within the boundaries of the cell. The strength of the signal received by each of the antenna sets at each frequency in the assigned set of transmission frequencies for the cell is constantly monitored. Transmission service area by the respective antenna sets in the cell, for each frequency in the assigned set of transmission frequencies for the cell, is confined to the antenna set in the cell which receives the strongest signal at each such frequency.

DETAILED DESCRIPTION OF THE INVENTION

Figure 1:
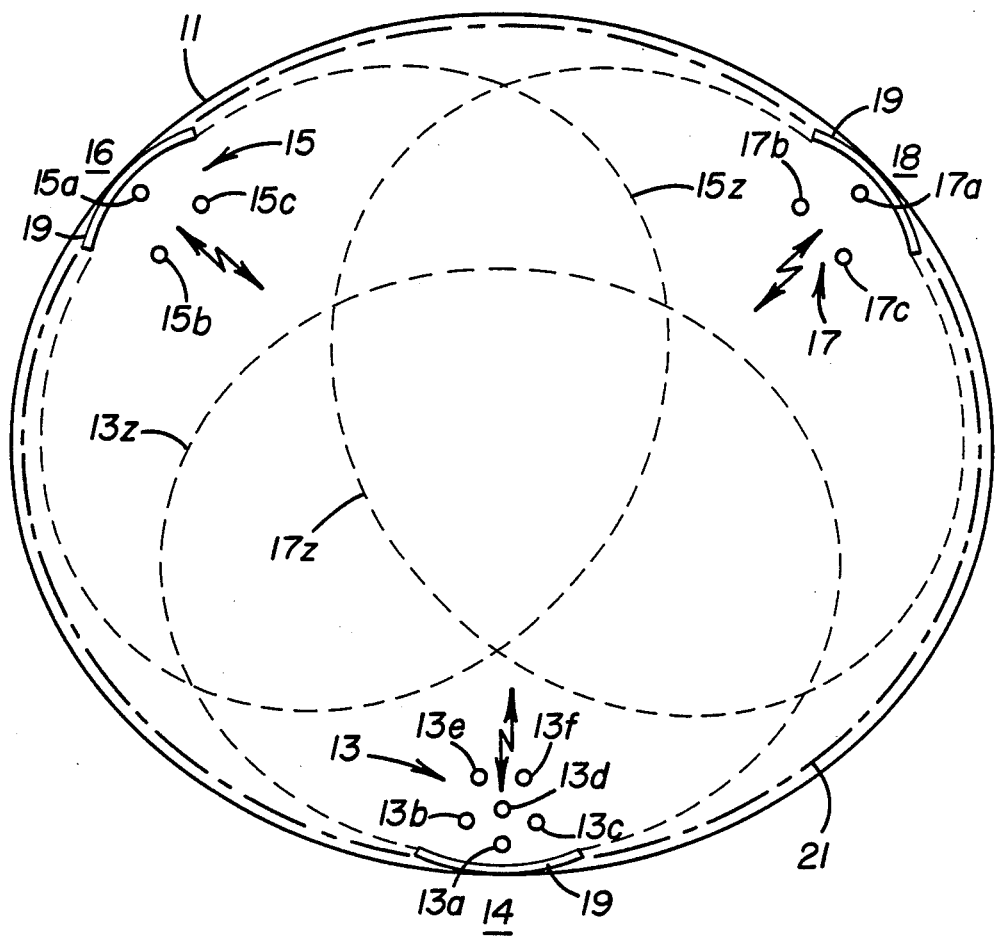
FIG. 1 is a schematic diagram illustrating a typical layout of a cell employed in the invention.

Referring now to FIG. 1, a cell constructed in accordance with the invention is illustrated schematically. The outer boundary of the cell is delineated by the circle 11 in solid line. Although shown as a circle, cells are often represented as hexagons in designed illustrations. In reality, however, due to the shape of terrain and the presence of buildings and other structures, the actual boundary of the cell 11 may be of an irregular shape. In any case, the solid line 11 is intended to represent that location at which a mobile telephone unit passes from the influence of the illustrated cell and into the influence of an adjacent cell.

Three separate antenna sets 13, 15, and 17 are positioned within the cell 11. The antenna set 13 is located at a site 14, whereas the antenna sets 15 and 17 are located at sites 16 and 18, respectively. Depending upon the particular conditions within the cell area, other numbers of antenna sets may be usefully employed, and it is to be understood that the use of three sets in FIG. 1 is for illustrative purposes only. Each antenna set includes a transmitting antenna 13a, 15a, and 17a, respectively. Each antenna set also includes two receiving antennas 13b and 13c, 15b and 15c, and 17b and 17C, respectively. Duplication of the receiving antennas at each site is for diversity use to reduce signal fading by combining the signals. In addition, the antenna set 13 includes a control transmitting antenna 13d for transmitting control signals, and duplicate control receiving antennas 13e and 13f for receiving control signals, as will be explained below. The antenna site 14 is called a master sub-site, whereas the antenna sites 16 and 18 are called slave sub-sites. The determination of the locations of sub-sites and the number of sub-sites in a cell can be based on the Lee's coverage prediction model published in IEEE Transactions on Vehicular Technology, February, 1988.

Each antenna set has its own zone of major influence for transmitting and receiving signals. Thus, the antenna set 13 at the master sub-site 14 has a zone indicated by the dotted line 13z. Similarly, the antenna set 15 at the slave sub-site 16 has a zone of influence designated by the dotted line 15z and the antenna set 17 at the slave sub-site 18 has a zone of influence designated by the dotted line 17z. It may be seen from FIG. 1 that the zones overlap in certain areas. Directionality is provided to the antenna sets so that the zones of influence, i.e. the zones of propagation and reception of signals, are limited to be substantially within the boundaries of the cell 11. Such directionality is provided by suitable means such as shown as a symbolic means 19 arranged at each antenna set or sub-site. The directionality means 19 can be a reflector for each individual antenna, or any other suitable arrangement to provide the desired directionality and coverage. The set of control antennas 13d, 13e and 13f, however, is configured to have a greater zone of influence, this being indicated by the dash-dot line 21, substantially coextensive with the limits of the cell 11.

Figure 2:
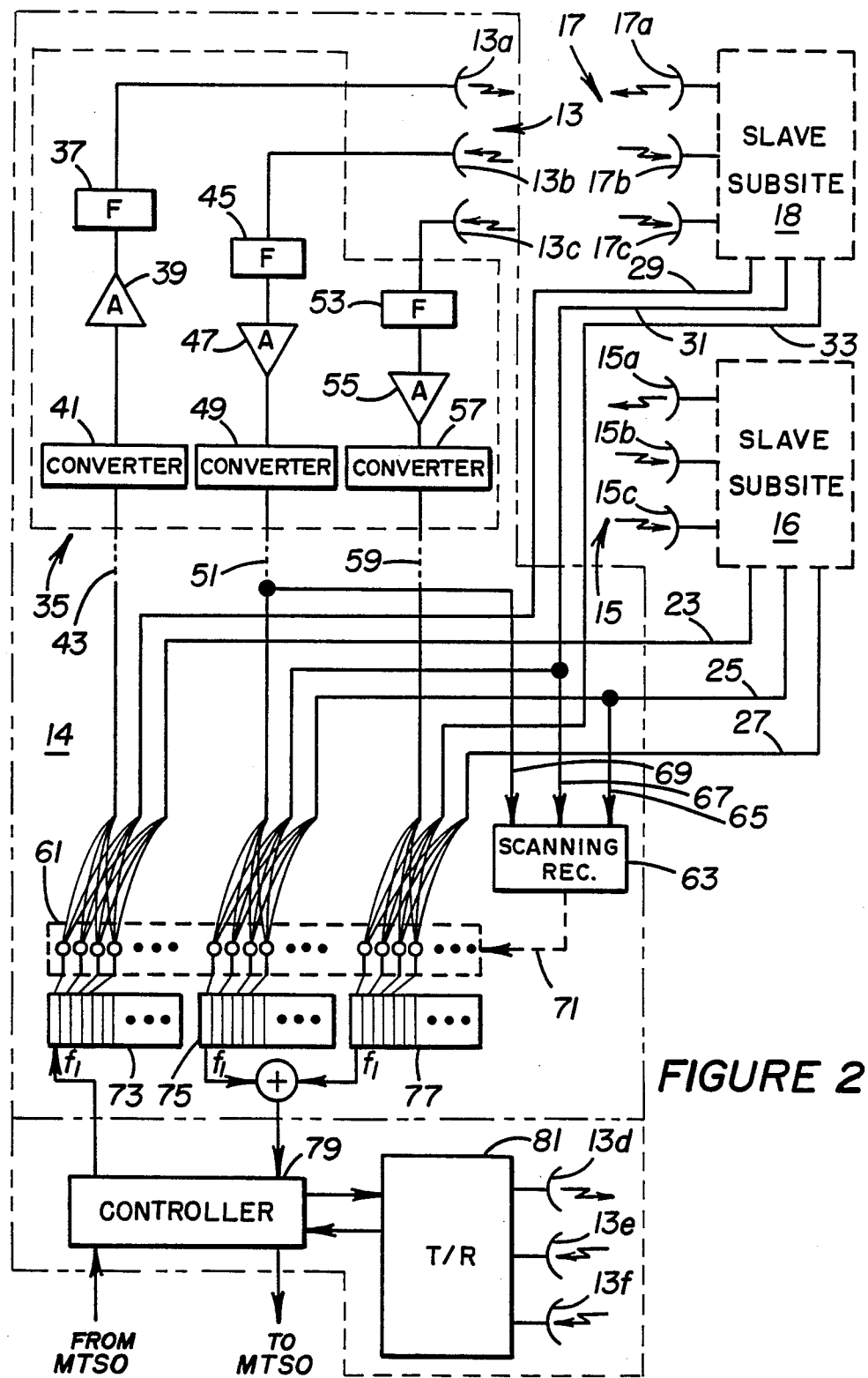
FIG. 2 is a schematic diagram illustrating the interconnection of the antenna sets in a cell according to the invention.

Referring more particularly to FIG. 2, a block diagram of the electronics associated with the cell of FIG. 1 is set forth. The two slave sub-sites 16 and 18 are each coupled to the master sub-site 14 and are controlled therefrom. In the illustrated embodiment, the slave sub-site 16 is connected to the master sub-site 14 via three cables 23, 25, and 27. The slave sub-site 18 is connected to the master sub-site 14 via cables 29, 31, and 33. The specific nature of the signals assigned to the respective cables will be described below. Generally, however, the cables 23 and 29 carry transmitter antenna signals whereas the cables 25, 27, 31, and 33, carry receiver antenna signals. The illustrated embodiment depicts the communication between the slave sub-sites and the master sub-site as being via cable. It will be apparent to those skilled in the art that such cables may include, for example, T1 carrier cables, optical fibers, or the like. The cables may also be replaced by microwave channels.

The master sub-site 14, and in addition, both slave sub-sites 16 and 18, contain a signal processing section. The signal processing section 35 for the master sub-site 14 is illustrated in FIG. 2. No signal processing sections for the slave sub-sites 16 and 18 are illustrated. However, it is to be understood that both slave sub-sites 16 and 18 contain a signal processing section identical to the signal processing section 35 in the master sub-site 14.

The signal processing section 35 includes a filter 37, an amplifier 39 and a converter 41 connecting the transmitter antenna 13a, in stated order, to a cable output 43. A similar filter 45, amplifier 47, and converter 49 connect the antenna 13b to a cable output 51. A similar arrangement of a filter 53 amplifier 55 and converter 57 connect the antenna 13c to a cable output 59.

At the master sub-site 14, all of the cable connections 23, 25, 27, 29, 31, 33, 43, 51, and 59 terminate at a zone exchange or zone switch 61. In addition, connection is made from each of the output cables 25, 31, and 51, to a scanning receiver 63 via connections 65, 67, and 69, respectively. The scanning receiver 63 provides an output control signal, via a suitable connector 71, to the zone switch 61. The zone switch may be of any suitable construction to provide switching between the respective sub-sites 14, 16, and 18, depending upon the strength of the signal being received at a respective sub-site as determined by the scanning receiver 63. The master sub-site 14 further includes carrier frequency modules 73, 75, and 77. The module 73 is assigned to the transmitters, whereas the modules 75 and 77 are assigned to the receivers. Each module provides for the assigned set of carrier frequencies for the particular cell. For example, a portion of 395 voice channels and one of 21 set-up channels may be assigned for an individual cell.

The signals from the antennas received at the modules 75 and 77 are combined and conducted to a controller 79. The controller also provides signals to the transmitter module 73. The controller also determines which of the cables 23, 25 and 27 is connected to provide the received voice signals to the MTSO. The controller is connected via suitable connections, to and from the MTSO. In addition, the controller is connected to a transceiver 81 which transmits and receives signals on the three control antennas 13d, 13e and 13f.

The controller 79 measures the signal strength of a channel requested by the MTSO. If the initial call is in this particular cell, or if the call is handed off to this particular cell through the controller, the controller initiates transmission at a particular frequency assigned by MTSO to that call. The frequency assigned is the one which has the lowest noise level as determined by the controller. If during the call, the signal strength received from all antenna sets 13, 15, and 17, is below a preselected level, the controller initiates a handoff process from the MTSO to handoff the call to another cell.

In operation of the system above described, a mobile unit which is operating on an assigned frequency $f_1$ in the cell will typically be moving within the cell. All sub-sites within the cell will receive signal levels (strengths), but not the voice signals from the mobile unit, but only that sub-site at which the received signal level is the strongest will transmit and receive signals to the mobile unit and setup a call. When the mobile unit moves such that the received signal strength at a sub-site other than the one that is currently transmitting becomes strongest, the system operates to turn off the transmitter at the weaker sub-site and turn on the transmitter at the sub-site at which the stronger signal level is being received. The two-diversity receiver antennas are also switched to the proper sub-site to receive the call. The frequency, however, does not change and remains at $f_1$. Thus, no handoff has occurred in the traditional sense and the MTSO is not involved. As a result, no additional handoff load is added to the MTSO switching equipment.

In FIG. 2, the three amplifiers 39, 47, and 55 enhance the signals applied to their input from the filters 37, 45, and 53 respectively. These signals are then applied to the converters 41, 49 and 57, which either up convert or amplitude modulate the frequency to an optical frequency, where optical fibers are used for the cable connections, or down convert the frequency to a base band for passing through T1 carrier cables. They may also convert to microwave where microwave channels are used. The filters, amplifiers and converters may be of any type suitable for the stated purpose.

The scanning receiver 63 at the master sub-site scans all the sub-sites 14, 16, and 18, and all the frequency channels assigned in the particular set assigned to that cell. It then chooses the strongest signal levels among all sub-sites for each frequency channel. The zone exchanger or zone switch 61 links the transmit signal for a respective frequency to the desired sub-site and terminates the old sub-site transmitter. The received signal is also switched to the same new sub-site.

Unlike the sub-site antennas, the control signal antennas cover the entire cell and are used for setting up calls in the conventional manner known to those skilled in the art. Further elaboration on such procedure, as well as on cellular telephone systems in general, may be found in the book "Mobile Cellular Telecommunications Systems", by William C. Y. Lee, McGraw-Hill Book Company, New York, St. Louis, San Francisco, 1989.

The advantages accruing from the cell design in accordance with the present invention include a significant improvement in uniformity of coverage as opposed to cells in which only a single antenna site in each cell is employed. This becomes particularly advantageous in connection with a small cell, i.e. a cell having a radius of less than one mile. Since, by reducing the effective radiation area covered by each sub-site, the effective radiation radius for each frequency is reduced, a consequent lowering of the interference level also results. All of this is accomplished without the necessity of handoffs within the cell itself. The frequency at which transmission occurs does not change in a cell, although the active sub-site in a cell switches from one to another according to signal level. This is accomplished in a relatively simple and economical way, and enables the size of a cell to be reduced to as low as 500 to 1000 feet in radius.

Various modifications of the invention, in addition to those shown and described herein, will be apparent to those skilled in the art from the foregoing description and accompanying drawings. Such modifications are intended to fall within the scope of the appended claims.

What is claimed is:

1. In a cellular telephone system wherein a plurality of contiguous cells, each having a different assigned set of transmission frequencies, are arranged with handoff means for maintaining continuous communication with mobile telephones moving from cell to cell, at least one of said cells comprising:
   a cell having a plurality of antenna sets, each set being positioned and having transmitting and receiving means directionally configured to limit propagation and reception of signals to substantially within the boundaries of said cell,
   control means including means for monitoring the strength of the signal received by each of said antenna sets at each frequency in the assigned set of transmission frequencies for said cell,
   and means for confining transmission, at each frequency in the assigned set of transmission frequencies for said cell, to the antenna set in said cell having the strongest received signal at each such frequency.

2. A cell according to claim 1 wherein said monitoring means include frequency scanning receiver means for determining the strength of the signal at each of said antenna sets for each frequency in the assigned set.

3. A cell according to claim 2 wherein said control means include means for generating a handoff signal when the signal strength at all of said antenna sets determined by said monitoring means falls below a predetermined level.

4. A cell according to claim 1 wherein the number of said antenna sets is at least three.

5. A cell according to claim 1 wherein said control means includes means for setting up calls comprising a control signal antenna located at one of said antenna sets, said control signal antenna being configured to limit propagation and reception of signals to and from the others of said antenna sets in said cell.

6. A cell according to claim 1 wherein each of said antenna sets comprises a transmitting antenna and two receiving antennas.

7. A cellular telephone system including a plurality of contiguous cells, each of said cells having different assigned sets of transmission frequencies, said cells being arranged with handoff means for maintaining continuous communication with mobile telephones moving from cell to cell, at least one of said cells comprising, a cell having a plurality of antenna sets, each set being positioned and having transmitting and receiving means directionally configured to limit propagation and reception of signals to substantially within the boundaries of said cell, control means including means for monitoring the strength of the signal received by each of said antenna sets at each frequency in the assigned set of transmission frequencies for said cell, and means for confining transmission, at each frequency in the assigned set of transmission frequencies for said cell, to the antenna set in said cell having the strongest received signal at each such frequency.

8. A system according to claim 7 wherein said monitoring means include frequency scanning receiver means for determining the strength of the signal at each of said antenna sets for each frequency in the assigned set.

9. A system according to claim 8 wherein said control means include means for generating a handoff signal when the signal strength at all of said antenna sets determined by said monitoring means falls below a predetermined level.

10. A system according to claim 7 wherein the number of said antenna sets is at least three.

11. A system according to claim 7 wherein said control means includes means for setting up calls comprising a control signal antenna located at one of said antenna sets, said control signal antenna being configured to limit propagation and reception of signals to and from the others of said antenna sets in said cell.

12. A system according to claim 7 wherein each of said antenna sets comprises a transmitting antenna and two receiving antennas.

13. A system according to claim 7 wherein each of said antenna sets is located at a separate sub-site, and wherein said control means and said confining means are located at a single one of said sub-sites.

14. A system according to claim 13 including cable means interconnecting sub-sites.

15. A system according to claim 8 including a mobile telephone switching office, wherein said control means inform said switching office of the one of said frequencies which is unused which said scanning receiver means determines has the lowest interference level.

* * * * *